United States Patent
Levy et al.

(10) Patent No.: US 12,210,745 B2
(45) Date of Patent: Jan. 28, 2025

(54) SIGNATURE-BASED IO USER CONNECTIONS BETWEEN IO USERS AND STORAGE VOLUMES

(71) Applicant: Dell Products L.P., Round Rock, TX (US)

(72) Inventors: Shoham Levy, Ra'anana (IL); Michal Sara Davidson, Beit Shemesh (IL)

(73) Assignee: Dell Products L.P., Round Rock, TX (US)

( * ) Notice: Subject to any disclaimer, the term of this patent is extended or adjusted under 35 U.S.C. 154(b) by 108 days.

(21) Appl. No.: 18/099,036

(22) Filed: Jan. 19, 2023

(65) Prior Publication Data

US 2024/0248603 A1    Jul. 25, 2024

(51) Int. Cl.
*G06F 3/06* (2006.01)
*G06F 13/42* (2006.01)
*H04L 9/32* (2006.01)

(52) U.S. Cl.
CPC ............ *G06F 3/061* (2013.01); *G06F 3/0665* (2013.01); *G06F 13/42* (2013.01); *H04L 9/3247* (2013.01); *G06F 3/0679* (2013.01)

(58) Field of Classification Search
CPC ...... G06F 3/061; G06F 3/0665; G06F 3/0679; G06F 13/42; H04L 9/3247
See application file for complete search history.

(56) References Cited

U.S. PATENT DOCUMENTS 10,078,754 B1 * 9/2018 Brandwine ............ G06F 21/78
10,691,837 B1 * 6/2020 Martel .................. H04L 9/0863
10,867,052 B1 * 12/2020 Kumar .................... G06F 3/067
11,455,432 B1 * 9/2022 Martel .................. H04L 9/0869
11,868,213 B2 * 1/2024 Zheng ................. G06F 11/1458

(Continued)

OTHER PUBLICATIONS

"Storage vol. Connection"; IBM Cloud Paks/IBM Cloud Pak for Data/4.0, updated Nov. 21, 2022; https://www.ibm.com/docs/en/cloud-paks/cp-data/4.0?topic=catalogs-storage-volume-connection; downloaded on Jan. 10, 2023.

(Continued)

*Primary Examiner* — Henry Tsai
*Assistant Examiner* — Aurangzeb Hassan
(74) *Attorney, Agent, or Firm* — Ryan, Mason & Lewis, LLP

(57) ABSTRACT

Techniques are provided for creating secure IO (input/output) user connections between IO users and storage volumes. One method comprises establishing an IO user connection between a processor-based IO user and at least a portion of a storage volume on a storage array; obtaining IO user context information associated with the IO user connection, wherein the IO user context information comprises one or more keys for signature verification; and transmitting one or more IO operations over the IO user connection, wherein a signature associated with a given IO operation is evaluated to verify that the signature is a valid signature of one or more of the processor-based IO user and the storage array. The obtained IO user context information may further comprise an identifier of a signature generation function that generates the signature associated with the given IO operation and a connection identity string identifying the IO user connection.

20 Claims, 11 Drawing Sheets

(56) References Cited

U.S. PATENT DOCUMENTS

| | | | | |
|---|---|---|---|---|
| 2008/0109615 | A1* | 5/2008 | Morishita | G06F 3/0619 |
| | | | | 711/154 |
| 2021/0319121 | A1* | 10/2021 | Dewan | G06F 21/602 |
| 2022/0156139 | A1* | 5/2022 | Kulli | G06F 16/1873 |
| 2024/0037223 | A1* | 2/2024 | Venier | G06F 21/55 |

OTHER PUBLICATIONS

Connecting to a Volume; Oracle Cloud Infrastructure Documentation; updated Jan. 4, 2023; https://docs.oracle.com/en-us/iaas/Content/Block/Tasks/connectingtoavolume.htm; downloaded on Jan. 10, 2023.

"Certificate-Based Authentication Definition"; https://www.yubico.com/resources/glossary/what-is-certificate-based-authentication/#:~:text=In%20a%20nutshell%2C%20certificate%2Dbased,application%2C%20network%20or%20other%20resource; downloaded on Jan. 10, 2023.

"How TLS Provides Identification, Authentication, Confidentiality, and Integrity"; IBM MQ/9.1; Updated Nov. 30, 2022; https://www.ibm.com/docs/en/ibm-mq/9.1?topic=tls-how-provides-identification-authentication-confidentiality-integrity; downloaded on Jan. 10, 2023.

* cited by examiner

| IO USER | STORAGE VOLUME / AREA | CONNECTION HOST DEVICE | CONNECTION IDENTITY STRING | IO USER MAC KEY | STORAGE ARRAY MAC KEY | MAC FUNCTION |
|---|---|---|---|---|---|---|
| sqldb | 0x44h5ad40 / 0-100,000 | SERVER-1 | 6f12dc4909680e4f8 7438919c0793fe9 | QY3RNUF 5 | BHYJSQ8L | HMAC |
| sqldb | 0x44h5ad40 / 100,001 – END (DIFFERENT VOLUME AREAS, SAME APP) | SERVER-1 | d48123a0e0dbb9b4 c5e7b5f94710fc03 | P3CINT0K | A05ADC2I | HMAC |
| sqldb | 0x44h5ad40 / 0-100,000 (DIFFERENT HOST, SAME VOLUME, SAME APP) | SERVER-2 | f6f31956692246fd8 1a81620628c74c5 | R9739ELQ | T7KV7SCY | OMAC |
| Videoeditor | 0xaa367d98 | SERVER-2 | bc63d2a99731531b c949bfb322819aab | HO0HIZAK | OMJM8QB 2 | UMAC-VMAC |

SIGNATURE-BASED IO USER CONNECTIONS BETWEEN IO USERS AND STORAGE VOLUMES

FIELD

The field relates generally to information processing systems, and more particularly to communications in such systems.

BACKGROUND

A host device often executes multiple applications at the same time, with a single connection between a given host device (and the one or more applications executed by the given host device) and a storage volume. Once a storage volume is accessible to the given host device, the applications executed by the given host device have access to the storage volume. Thus, access to a storage volume is protected for each host device and the storage array comprising the storage volume is only aware of host devices using the storage volume (and not the one or more applications executed by such host devices).

A need exists for improved techniques for connecting IO (input/output) users, such as applications, to storage volumes.

SUMMARY

In one embodiment, a method comprises establishing an IO user connection between a processor-based IO user and at least a portion of a storage volume on a storage array; obtaining IO user context information associated with the IO user connection, wherein the IO user context information comprises one or more keys for signature verification; and transmitting one or more IO operations over the IO user connection, wherein a signature associated with a given IO operation is evaluated to verify that the signature is a valid signature of one or more of the processor-based IO user and the storage array.

In one or more embodiments, the obtained IO user context information further comprises an identifier of a signature generation function that is used to generate the signature associated with the given IO operation. The signature generation function may comprise a message authentication code generation function and wherein the signature associated with the given IO operation is generated by one or more of the processor-based IO user and the storage array by applying the message authentication code generation function to (i) a payload of the given IO operation and (ii) at least a portion of the IO user context information.

In some embodiments, the obtained IO user context information further comprises a connection identity string identifying the IO user connection and wherein the connection identity string is evaluated to determine whether the connection identity string is associated with an active IO user connection. The connection identity string may be further evaluated to determine whether the corresponding IO user connection is authorized to write to the at least the portion of the storage volume. The connection identity string may be used to identify a given set of attributes of the IO user connection. At least one of the one or more IO operations may be processed using an IO user context processing routine based at least in part on a presence of the connection identity string in the at least one IO operation.

In at least one embodiment, the establishing is performed by the processor-based IO user using a control path to the storage array. The obtained IO user context information may further comprise a timestamp that is evaluated to detect one or more anomalous IO operations. The processor-based IO user may comprise one or more of an application, an application acting on behalf of another user, an operating system of a host device, at least one processing device and a virtualized computing resource. When the processor-based IO user comprises an application, one or more wrapper libraries for read operations and write operations of the application may be used to process the one or more IO operations over the IO user connection.

Other illustrative embodiments include, without limitation, apparatus, systems, methods and computer program products comprising processor-readable storage media.

BRIEF DESCRIPTION OF THE DRAWINGS

FIG. 5 is a sample table for storing IO user context information associated with a number of different IO user connections, according to one exemplary embodiment;

DETAILED DESCRIPTION

Figure 1:
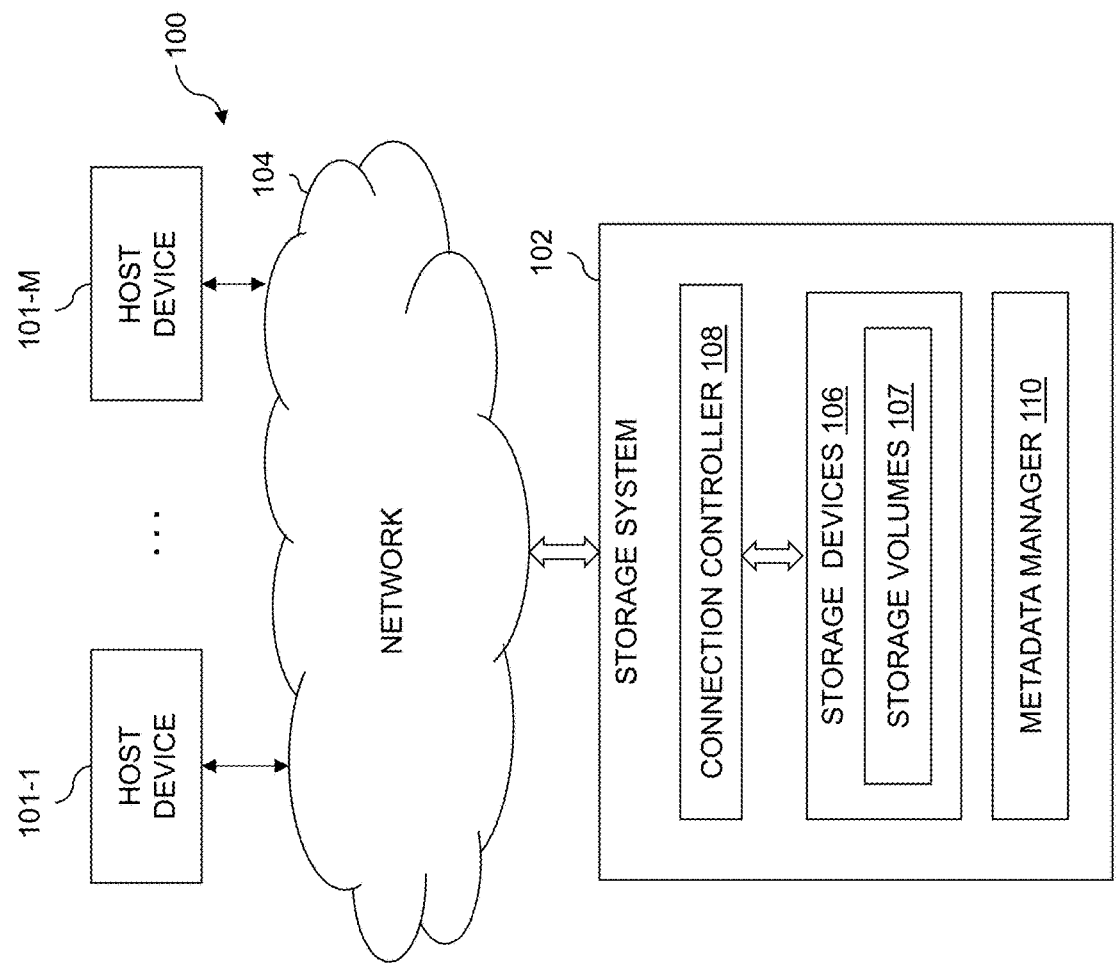
FIG. 1 illustrates an information processing system configured for creating secure IO user connections between IO users and storage volumes in accordance with an illustrative embodiment.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for creating secure IO user connections between IO users and storage volumes.

In one or more embodiments, techniques are provided for creating secure end-to-end IO user connections between IO users and storage volumes. In at least some embodiments, the disclosed IO user connection creation techniques define IO users with a storage array and associate each IO operation (e.g., read and write operations) with a corresponding IO user.

In at least one embodiment, the disclosed IO user connection creation techniques allow for IO user-level features, as opposed to the host-level features associated with current storage systems. In this manner, a protocol is provided in some embodiments for IO user-to-storage-array direct access, to allow IO users to define their own storage properties, regardless of the host device. For example, IO users can specify IO user-level features, such as IO user-level access control, IO user-level inflight data encryption, and advanced per-IO user storage performance analysis and tuning. For a more detailed discussion of techniques for IO user-level inflight data encryption, see, U.S. patent application Ser. No. 18/099,042, filed contemporaneously herewith, entitled "Encrypted IO User Connections Between IO Users and Storage Volumes," incorporated by reference herein in its entirety.

For example, end-to-end encryption may be established from a given IO user, such as an application executing on a host device, to a storage array, thereby protecting the IO user from operating system-level vulnerabilities. As used herein, the term processor-based IO user shall be broadly construed to encompass any processor-based user defined on a storage array for the purpose of generating IO operations related to storage volumes in an IO user-aware manner. As used herein, the term IO path shall be broadly construed to encompass any connection (e.g., SCSI (Small Computer System Interface), NVMe (NVM Express or Non-Volatile Memory Host Controller Interface Specification), and/or Storage Data Client (SDC)) used to transmit IO operations between a processor-based IO user and at least a portion of a storage volume.

In some embodiments, the processor-based IO user can represent, for example, an application, an application acting on behalf of another user, an operating system of a host device, at least one processing device and/or a virtualized computing resource (e.g., a container or virtual machine) that generates one or more IO operations. For example, if an operating system has a mechanism for identifying a given processor-based IO user performing IO operations, then the operating system can implement the disclosed secure IO user connection creation techniques by establishing one IO user connection for a given processor-based IO user and storage volume (or portion thereof).

FIG. 1 shows an information processing system 100 configured in accordance with an illustrative embodiment. The information processing system 100 comprises a plurality of host devices 101-1 through 101-M, collectively referred to herein as host devices 101 (e.g., host servers). The host devices 101 are configured to communicate with a storage system 102 over a network 104.

The host devices 101 illustratively comprise servers or other types of computers of an enterprise computer system, cloud-based computer system or other arrangement of multiple compute nodes associated with respective users.

For example, the host devices 101 in some embodiments illustratively provide compute services such as execution of one or more applications on behalf of each of one or more users associated with respective ones of the host devices. Such applications illustratively generate IO operations that are processed by the storage system 102. The term "input/output" as used herein refers to at least one of input and output. For example, IO operations may comprise write requests and/or read requests directed to logical addresses of a particular logical storage volume of the storage system 102. These and other types of IO operations are also generally referred to herein as IO requests.

The storage system 102 illustratively comprises processing devices of one or more processing platforms. For example, the storage system 102 can comprise one or more processing devices each having a processor and a memory, possibly implementing virtual machines and/or containers, although numerous other configurations are possible.

The storage system 102 can additionally or alternatively be part of a cloud infrastructure such as an Amazon Web Services (AWS) system. Other examples of cloud-based systems that can be used to provide at least portions of the storage system 102 include Google Cloud Platform (GCP) and Microsoft Azure.

The host devices 101 and the storage system 102 may be implemented on a common processing platform, or on separate processing platforms. The host devices 101 are illustratively configured to write data to and read data from the storage system 102 in accordance with applications executing on those host devices for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, a Storage-as-a-Service (STaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 102 comprises a plurality of storage devices 106, one or more connection controllers 108 and a metadata manager 110. In at least some embodiments, each connection controller 108 is unique to a host device 101 and establishes different secure IO user connections between IO users of the corresponding host device 101 and storage volumes 107 of the storage system 102 (or portions of such storage volumes 107), using the disclosed secure IO user connection creation techniques. The metadata manager 110 may be implemented, for example, as a software object that manages the storage system 102. The metadata manager 110 may implement at least some of the disclosed functionality for secure IO user connection creation, as discussed further below in conjunction with, for example, FIG. 5.

The storage devices 106 store data of a plurality of storage volumes 107. For example, the storage volumes 107 may illustratively comprise respective logical units (LUNs) or other types of logical storage volumes. It is noted that in the context of a Linux/Unix system, a volume relates to a Logical Volume Manager (LVM), which can be used to manage mass storage devices; a physical volume generally refers to a storage device or partition; and a logical volume is created by the LVM and is a logical storage device (e.g., a LUN) which can span multiple physical volumes. The term "storage volume" as used herein is intended to be broadly construed, and shall encompass, for example, a virtual disk, other units of data storage, a logical storage volume, and a namespace, and should not be viewed as being limited to any particular format or configuration.

The storage devices 106 of the storage system 102 illustratively comprise solid state drives (SSDs). Such SSDs are implemented using NVM devices such as flash memory. Other types of NVM devices that can be used to implement at least a portion of the storage devices include non-volatile random-access memory (NVRAM), phase-change RAM (PC-RAM), magnetic RAM (MRAM), resistive RAM, and spin torque transfer magneto-resistive RAM (STT-MRAM). These and various combinations of multiple different types of NVM devices may also be used. For example, hard disk drives (HDDs) can be used in combination with or in place of SSDs or other types of NVM devices in the storage system 102.

It is therefore to be appreciated that numerous different types of storage devices 106 can be used in the storage system 102 in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives, storage appliances or other types of storage devices.

In some embodiments, the storage system 102 illustratively comprises a scale-out all-flash distributed content addressable storage (CAS) system, such as a storage array. A wide variety of other types of distributed or non-distributed storage arrays can be used in implementing the storage system 102 in other embodiments. Additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

The term "storage system" as used herein is therefore intended to be broadly construed, and should not be viewed as being limited to particular storage system types, such as, for example, CAS systems, distributed storage systems, or storage systems based on flash memory or other types of NVM storage devices. A given storage system as the term is broadly used herein can comprise, for example, any type of system comprising multiple storage devices, such as NAS, storage area networks (SANs), direct-attached storage (DAS) and distributed DAS, as well as combinations of these and other storage types, including software-defined storage.

The host devices 101 are configured to interact over the network 104 with the storage system 102. Such interaction illustratively includes generating IO operations, such as write and read requests, and sending such requests over the network 104 for processing by the storage system 102. In some embodiments, each of the host devices 101 comprises a multi-path input/output (MPIO) driver configured to control delivery of IO operations from the host device to the storage system 102 over selected ones of a plurality of paths through the network 104. The MPIO driver may comprise, for example, an otherwise conventional MPIO driver. The paths are illustratively associated with respective initiator-target pairs, with each of a plurality of initiators of the initiator-target pairs comprising a corresponding host bus adaptor (HBA) of the host device, and each of a plurality of targets of the initiator-target pairs comprising a corresponding port of the storage system 102.

In some embodiments, the storage system 102 is implemented as a distributed storage system, also referred to herein as a clustered storage system, comprising a plurality of storage nodes. Each of at least a subset of the storage nodes illustratively comprises a set of processing modules configured to communicate with corresponding sets of processing modules on other ones of the storage nodes. The sets of processing modules of the storage nodes of the storage system 102 in such an embodiment collectively comprise at least a portion of the storage controller of the storage system 102. For example, in some embodiments the sets of processing modules of the storage nodes collectively comprise a distributed storage controller of the storage system 102. A "distributed storage system" as that term is broadly used herein is intended to encompass any storage system that is distributed across multiple storage nodes.

A wide variety of alternative configurations of nodes and processing modules are possible in other embodiments. Also, the term "storage node" as used herein is intended to be broadly construed, and may comprise a node that implements storage control functionality but does not necessarily incorporate storage devices.

The storage system 102 in the FIG. 1 embodiment is assumed to be implemented using at least one processing platform, with each such processing platform comprising one or more processing devices, and each such processing device comprising a processor coupled to a memory. Such processing devices can illustratively include particular arrangements of compute, storage and network resources. As indicated previously, the host devices 101 may be implemented in whole or in part on the same processing platform as the storage system 102, or on a separate processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 101 and the storage system 102 to reside in different data centers.

Additional examples of processing platforms utilized to implement host devices 101 and storage system 102 in illustrative embodiments will be described in more detail below in conjunction with FIGS. 10 and 11.

It is to be appreciated that these and other features of illustrative embodiments are presented by way of example only, and should not be construed as limiting in any way. For example, the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

Accordingly, different numbers, types and arrangements of system components such as host devices 101, storage system 102, and network 104 can be used in other embodiments.

It should be understood that the particular sets of components implemented in the system 100 as illustrated in FIG. 1 are presented by way of example only. In other embodiments, only subsets of these components, or additional or alternative sets of components, may be used, and such components may exhibit alternative functionality and configurations.

Figure 2:
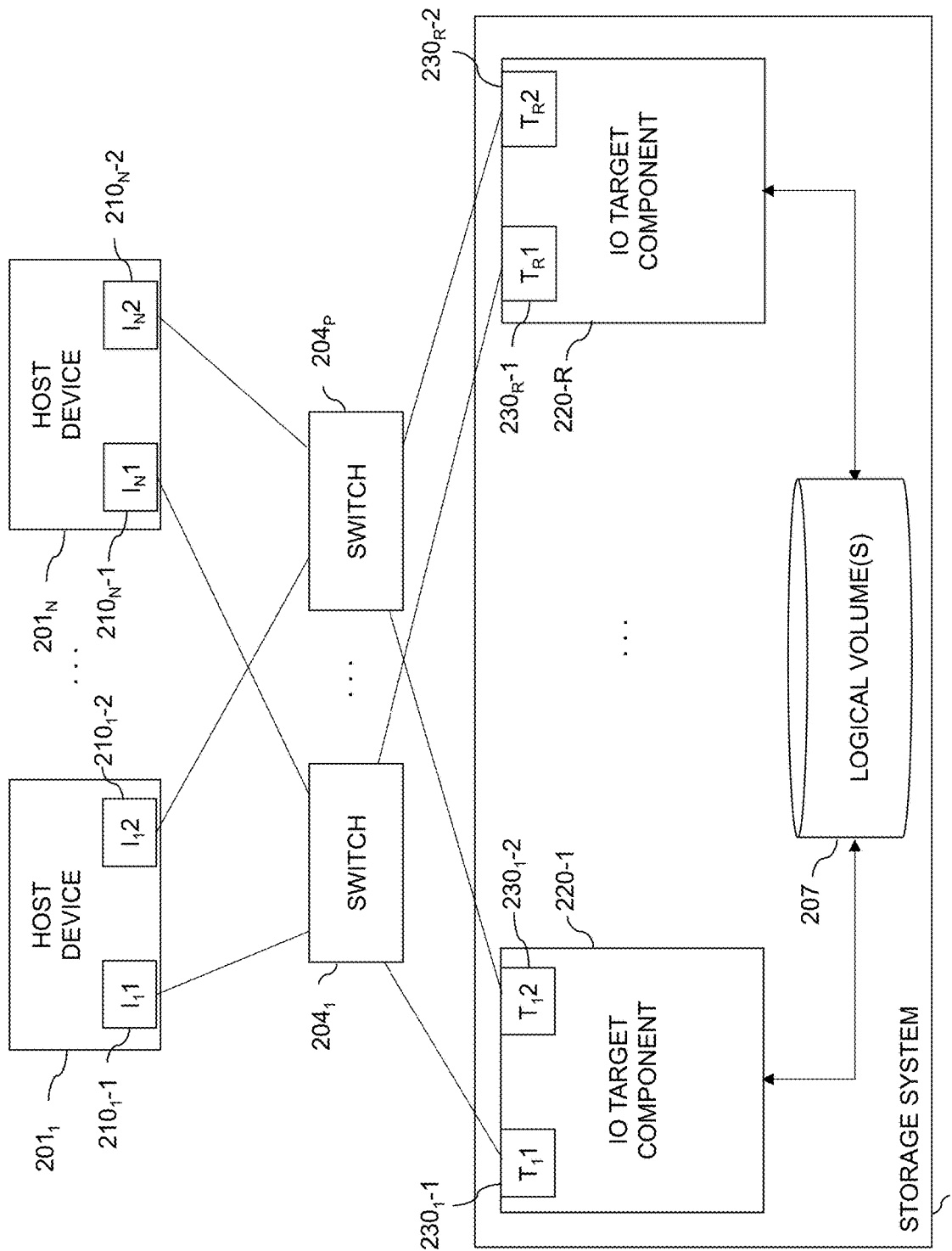
FIG. 2 is a block diagram illustrating switches that connect between host devices and components of the storage system of FIG. 1 in one illustrative embodiment.

FIG. 2 is a block diagram illustrating switches $204_1$ through $204_P$ that connect between host devices $201_1$ through $201_N$ and IO target components 220-1 through 220-R (e.g., storage data targets) of a storage system 202 in one or more illustrative embodiments.

Each of the host devices 201 illustratively has one or more IO paths to the storage system 202 using one or more of the switches $204_1$ through $204_P$, with at least one of the storage devices 106 of the storage system 202 being visible to that host device 201 on a given one of the paths. A given one of the storage devices 106 (e.g., logical volumes 207) may be accessible to the given host device 201 over one or more IO paths.

In illustrative embodiments, with reference to the example of FIG. 2, each of the host devices $201_1$ through $201_N$ comprises one or more initiator ports 210, e.g., initiator ports $210_1$-1, $210_1$-2, $210_N$-1 and $210_N$-2, also sometimes referred to herein a host interfaces, which are utilized to communicate with the storage system 202 via one or more switches $204_1$ through $204_P$. In some embodiments, the initiator ports 210 are referred to as initiators for the IO paths. For example, the initiator port $210_1$-1 of host device $201_1$ may be referred to as initiator 1 ($I_1$1) and the initiator port $210_1$-2 of host device $201_1$ may be referred to as initiator 2 ($I_1$2). Initiator ports 210 may comprise any circuitry that is configured to enable communication between the host devices 201 and the storage system 202 or any other devices.

In addition, with continued reference to the example of FIG. 2, each of the IO target components 220-1 through 220-R provides IO target functionality and comprises one or more target ports 230, e.g., target ports $230_1$-1, $230_1$-2, $230_R$-1 and $230_R$-2, also sometimes referred to herein a storage system interfaces, which are utilized to communicate with one or more host devices 201 via the one or more switches $204_1$ through $204_P$. In some embodiments, the target ports 230 are referred to as targets for the IO paths. For example, the target port $230_1$-1 of IO target component 220-1 may be referred to as target 1 ($T_1$1) and the target port $230_1$-2 of IO target component 220-1 may be referred to as target 2 ($T_1$2). Target ports 230 may comprise any circuitry that is configured to enable communication between the host devices 201 and the storage system 202 or any other devices.

In the example of FIG. 2, each IO target component 220 is associated with (e.g., serves) one or more target ports 230 and therefore the selection of a target port 230 also selects the IO target component 220 associated with the selected target port 230.

Figure 3:
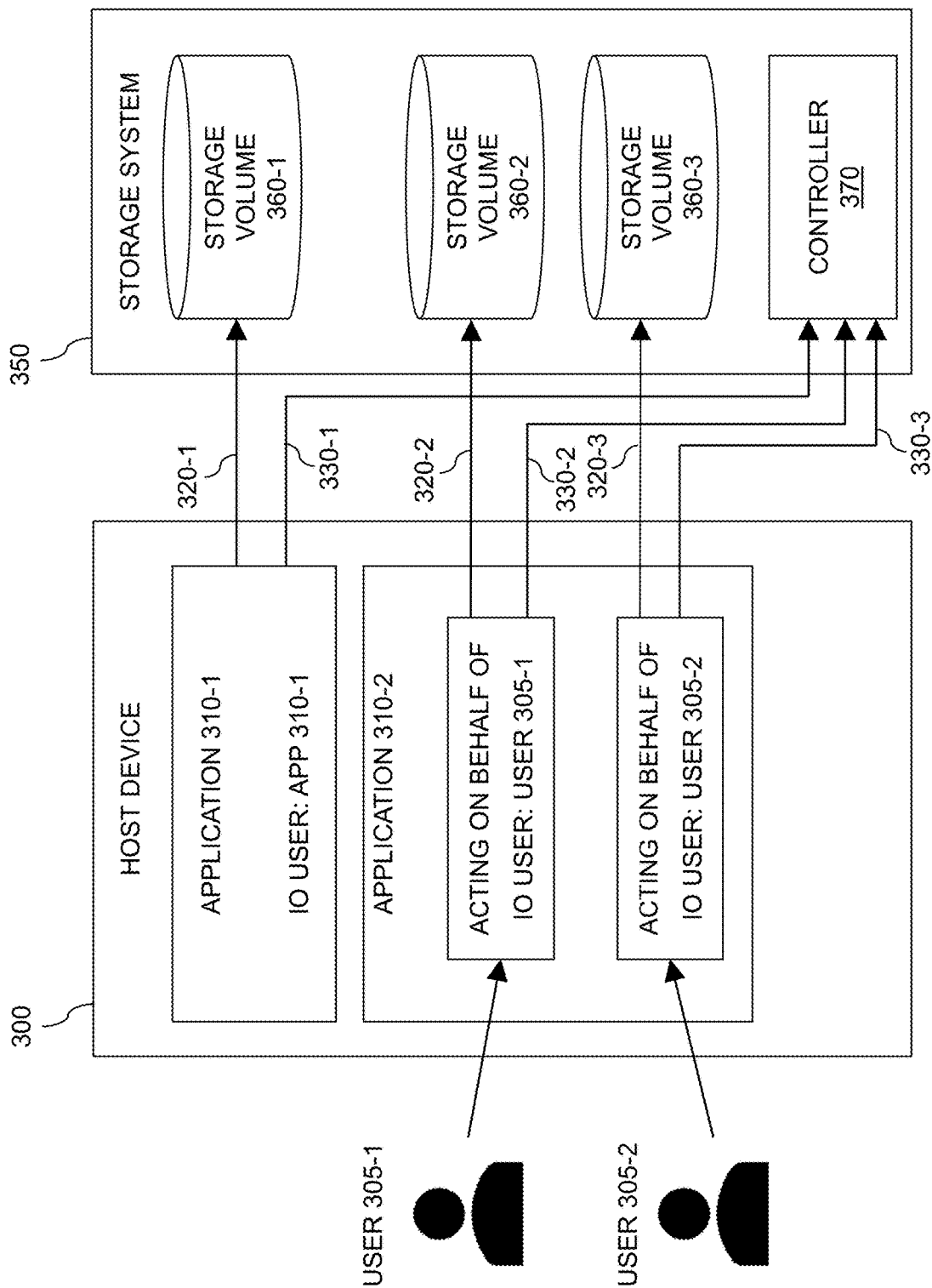
FIG. 3 is a block diagram illustrating a creation of IO user connections between IO users and storage volumes of a storage system, according to one embodiment of the disclosure.

FIG. 3 is a block diagram illustrating a creation of IO user connections between IO users associated with host devices, such as a host device 300, and at least portions of one or more storage volumes 360 of a storage system 350, according to one embodiment of the disclosure. In the example of FIG. 3, a first application 310-1 establishes a first IO user connection 320-1 between the application 310-1 and at least a portion of a storage volume 360-1. The IO user associated with the IO user connection 320-1 is the first application 310-1 itself.

A second application 310-2 establishes a second IO user connection 320-2 between the second application 310-2 acting on behalf of a human user 305-1 and at least a portion of a second storage volume 360-2. In some embodiments, the IO user associated with the IO user connection 320-2 can be considered the human user 305-1. In addition, the second application 310-2 establishes a third IO user connection 320-3 between the second application 310-2 acting on behalf of a different human user 305-2 and at least a portion of a third storage volume 360-3. The IO user associated with the IO user connection 320-3 can be considered the human user 305-2 in some embodiments.

In at least some embodiments, the IO user connections 320-1 through 320-3 comprise data paths between a given IO user and a respective portion of the storage volume. In addition, each IO user has a control path 330-1 through 330-3 between each respective IO user and a controller 370 (e.g., connection controller 108) of the storage system 350.

Figure 4:
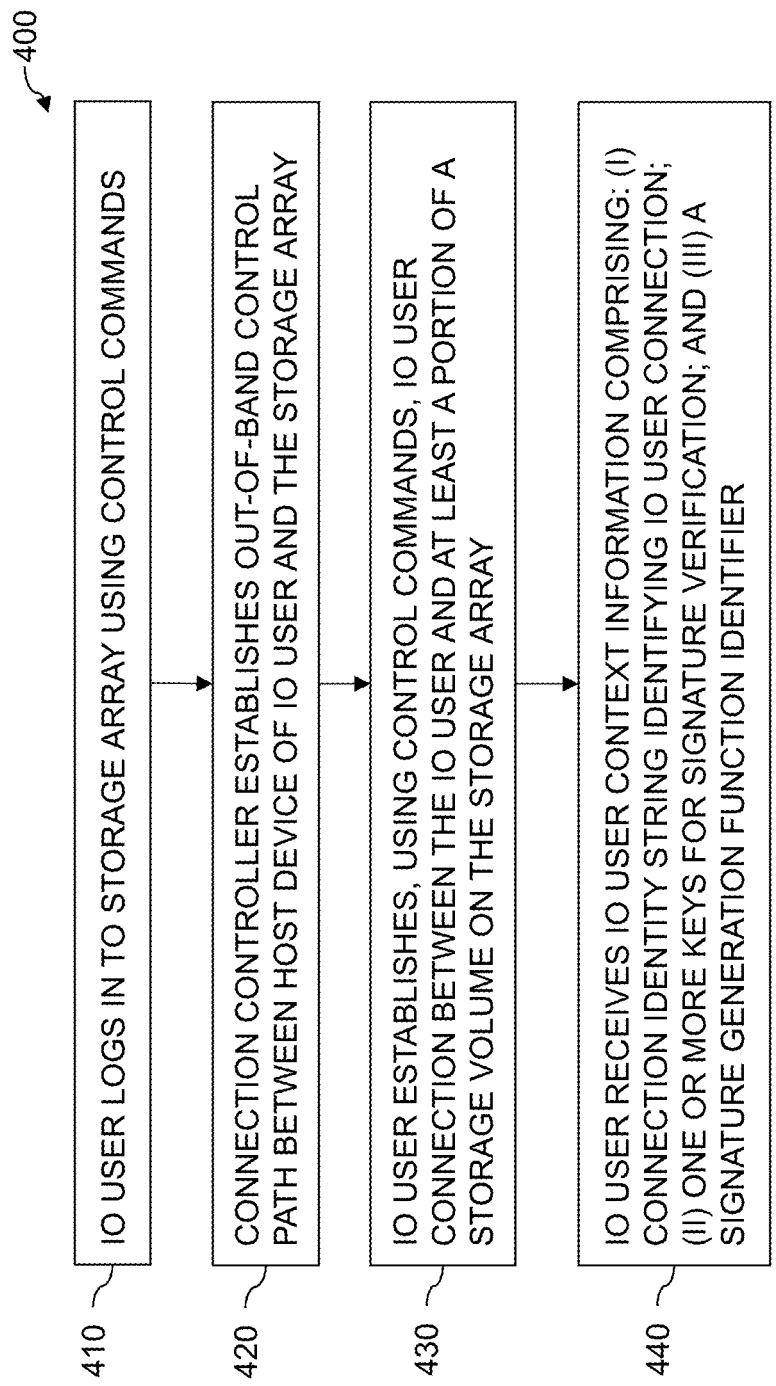
FIG. 4 is a flow diagram illustrating an exemplary implementation of a process for creating IO user connections between IO users and storage volumes of a storage system, according to one embodiment of the disclosure.

FIG. 4 is a flow diagram illustrating an exemplary implementation of a process 400 for creating IO user connections between IO users and storage volumes of a storage system, according to one embodiment of the disclosure. The process 400 is performed to prepare a storage array to receive IO user-specific connections between IO users and at least portions of storage volumes, in accordance with the disclosed secure IO user connection creation techniques.

In the example of FIG. 4, an IO user initially logs in to a storage array using one or more control commands in step 410. The login of the IO user in step 410 can be performed in any secure way, such as using a username/password pair, asymmetric keypairs and/or certificates. In at least some embodiments, IO users are predefined on the storage array. Such IO users, and their permissions, may be configured in advance by a storage array administrator. An application, or an application acting on behalf of another user, for example, can use one or more such IO users to send control commands to the storage array. The same IO user may also be used to identify IO operations.

In step 420, a connection controller, such as the connection controller 108, establishes an out-of-band control path between a given host device of the IO user and the storage array. It is assumed that an IO path between the given host device of the IO user and the storage array already exists. There are a number of methods to define and establish IO paths between host devices and storage arrays, and any transport mechanism can be used such as: a fiber channel, a TCP (Transmission Control Protocol) connection, or a mesh network.

The IO user establishes, using control commands on the out-of-band control path, an IO user connection in step 430 between the IO user and at least a portion of a storage volume on the storage array.

In step 440, the IO user receives IO user context information comprising, for example: (i) connection identity string identifying the established IO user connection; (ii) one or more keys for signature verification; and (iii) a signature generation function identifier (such as hash-based MAC, one-key MAC, universal hash-based MAC, or an asymmetric signature, such as an RSA asymmetric signature or an Elliptic Curve Digital Signature Algorithm (ECDSA) asymmetric signature, for example). The IO user connection attributes that need to be negotiated in step 430 may include:

- a storage volume (and/or a storage volume area, with a starting logical block address (LBA) and an ending LBA;
- a connection identity string identifying the IO user connection;
- one or more keys, such as symmetric MAC (message authentication code) keys or asymmetric signature keys, so that the IO user and the storage array can validate each other's signature on IO operations. For example, a first MAC key may be used for the host device to sign read operations, and a second MAC key may be used for the IO user to sign write operations. Signature keys often have a length in a range of 128 to 2048 bits, depending on the signature function and security level. In this manner, IO operations may be verified by evaluating MAC codes, for example, on each IO message; and
- a MAC function (to generate the MAC signature hash value).

In one or more embodiments, the IO user should keep sensitive IO user connection information, such as the MAC keys, in a secure memory location, such as a secure enclave. In this manner, memory snooping attacks from other applications or the operating system of the host device are prevented.

An IO user may define multiple IO user connections for the same storage volume, for the same or different storage volume sections, and from the same or different hosts. For example, multiple instances of a DBMS (database management system) may use the same IO user to create connections to the same IO user-aware storage volume from multiple host devices. Each such IO user connection may have a unique connection identity string. In addition, the same application may create multiple IO user-aware storage volume connections, each for a different user of a given application, for example.

In some embodiments, when IO user connection attributes are changed by the IO user, a new IO user connection can be created, and a new connection identity string can be generated. This connection identity string can then be used to differentiate between IOs that precede and succeed the change. Depending on the changed attributes, old connection identity strings can continue to be valid until explicitly canceled by the IO user using out-of-band control commands, or until some predefined time passed. For instance, if the compression method was changed, the old connection identity string and attributes may be still valid in the storage array for 30 seconds (e.g., to properly handle write operations that suffer network latency and/or disconnections).

As used herein, the term "in-band IO operation" shall be broadly construed to encompass IO operations, such as read and write operations, for a given protocol that are sent through the IO path. Likewise, the term "out-of-band control command" shall be broadly construed to encompass commands that control the flow of the in-band IO operations.

Once the IO user connection has been established using the process 400, there are different ways to implement in-band IO operations, such as:

- enhancements to existing block storage protocols (e.g., adding new protocol metadata fields or reusing existing protocol metadata fields for each IO operation);
- appending or prepending the IO payload with predefined metadata; and/or
- defining a new block storage protocol.

There are also different ways to implement out-of-band control commands, such as:

- adding, reusing and/or enhancing existing block storage protocol control commands;
- defining special IO payloads that will be interpreted as control operations by the storage array and IO user; and/or
- using a different connection to the storage array, other than the IO path, such as a REST API to the controller of the storage array.

FIG. 5 is a sample table 500 for storing IO user context information associated with a number of different IO user connections, according to one exemplary embodiment. Among other benefits, the sample table 500 maps connection identity strings to corresponding IO users. The sample table 500 comprises IO user context information that can be added to in-band IO operations directed to an IO user-aware storage volume. The IO user context information in the sample table 500 of FIG. 5 comprises the following fields for each IO user connection: IO user identifier; storage volume identifier (or a portion thereof); host device identifier; connection identity string; IO user MAC key; storage array MAC key; and MAC function.

The MAC keys (or other signature keys) of the IO user and the storage array are determined for each session, in at least some embodiments. The MAC keys may be stored, for example, in a secure memory and be 128 bits long, and are used to generate a signature for the payload and the IO user context information. In at least some embodiments, the MAC function is applied to the payload and the IO user context information fields (other than the MAC fields). The storage array will sign the payload for read operations and the IO user will sign the payload for write operations.

The connection identity string may be, for example, a 128-byte long UUID (universally unique identifier). The connection identity string may be used to identify the IO user connection. The presence of the connection identity string can be used to differentiate between regular IO operations and IO user-aware IO operations when the protocol is implemented as part of the IO payload. One or more additional fields may optionally be added to the IO user context information for additional features on top of the IO user-aware storage volumes, such as per-IO metadata and/or in-flight encryption.

A timestamp (e.g., a duration since an epoch in milliseconds), such as a 64-bit unsigned integer may be added to each IO operation for additional validation, and to detect anomalous IO operations, such as IO operations associated with replay attacks.

Figure 6:
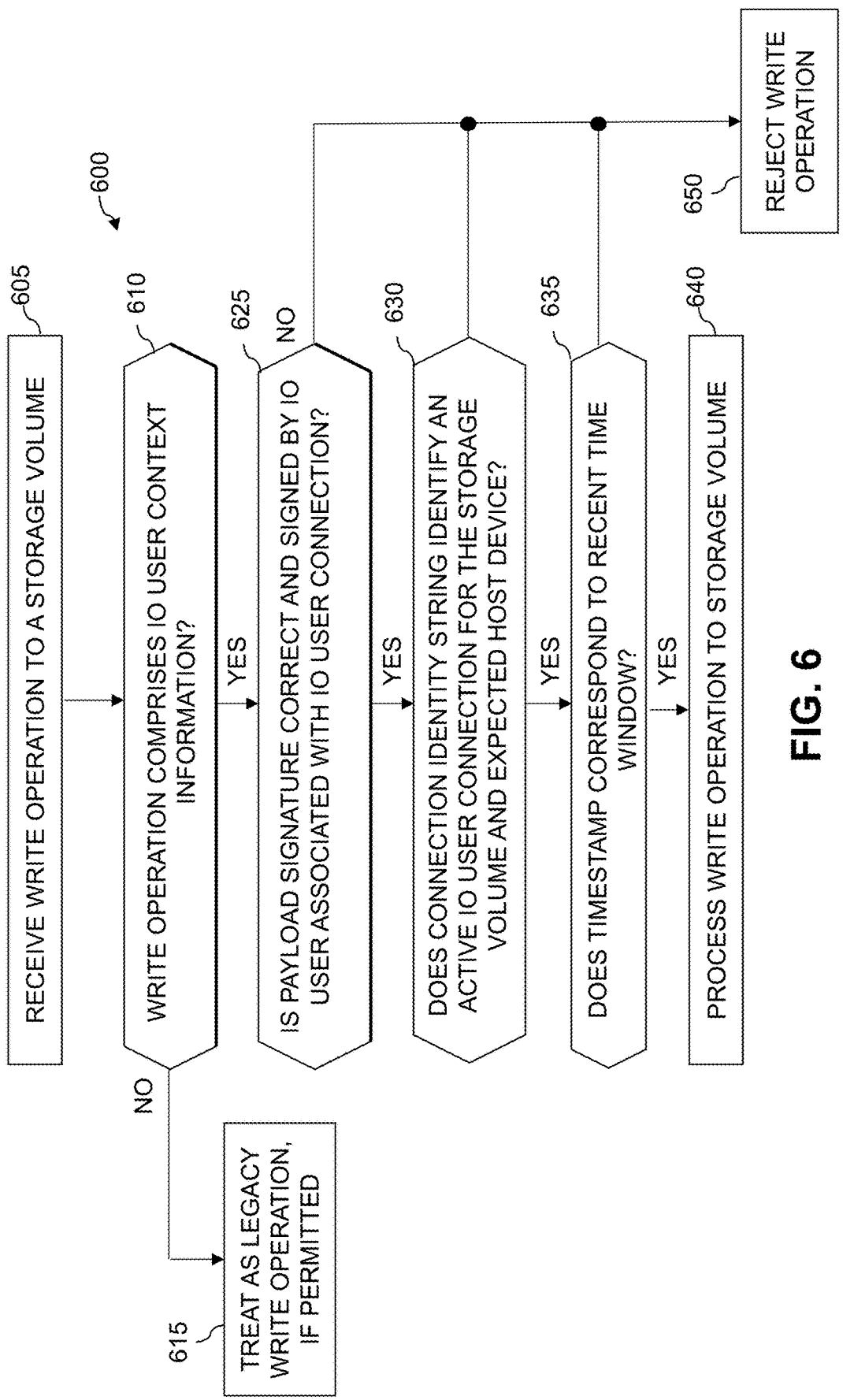
FIG. 6 is a flow diagram illustrating an exemplary implementation of a method for processing write operations over IO user connections, according to one embodiment of the disclosure.

FIG. 6 is a flow diagram illustrating an exemplary implementation of a method 600 for processing write operations over IO user connections, according to one embodiment of the disclosure. In the example of FIG. 6, the method 600 receives a write operation to at least a portion of a storage volume in step 605.

A test is performed in step 610 to determine if the received write operation comprises IO user context information. If it is determined in step 610 that the received write operation does not comprise IO user context information, then the write operation is processed as a legacy write operation in step 615, if permitted. If, however, it is determined in step 610 that the received write operation does comprise IO user context information, then a further test is performed in step 625 to determine if the payload signature associated with the write operation is correct and signed by the IO user associated with the IO user connection on which the write operation was received.

If it is determined in step 625 that the payload signature associated with the write operation is not correct or is not signed by the IO user associated with the IO user connection, then the write operation is rejected in step 650. If, however, it is determined in step 625 that the payload signature associated with the write operation is correct and is signed by the IO user associated with the IO user connection, then a further test is performed in step 630 to determine if the connection identity string identifies an active IO user connection for the storage volume and expected host device.

If it is determined in step 630 that the connection identity string does not identify an active IO user connection for the storage volume and expected host device, then the write operation is rejected in step 650. If, however, it is determined in step 630 that the connection identity string does identify an active IO user connection for the storage volume and expected host device, then a further test is performed in step 635 to determine if the timestamp of the write operation corresponds to a recent time window (e.g., of a configurable or designated size).

If it is determined in step 635 that the timestamp of the write operation does not correspond to a recent time window, then the write operation is rejected in step 650. If, however, it is determined in step 635 that the timestamp of the write operation does correspond to a recent time window, then the write operation is processed to the storage volume in step 640.

The sequence of steps 625, 630, 635, 640, 650 (or a subset thereof) is sometimes referred to herein as an IO user context processing routine for write operations. It is noted that the test performed in steps 625, 630 and 635 can be performed in any order.

In at least some embodiments, IO users writing to IO user-aware storage volumes can add IO user context information to write operations. When a write operation arrives at the storage array, the write operation goes through several checks, as illustrated using the example of FIG. 6. If any of the checks fails, the write operation will be rejected in step 650. When the storage array returns an acknowledgement or failure indication for the write operation, the storage array can optionally add IO user context information to the returned information (e.g., to prevent man-in-the-middle attacks). Then, the IO user can validate the authenticity of the IO status.

Figure 7:
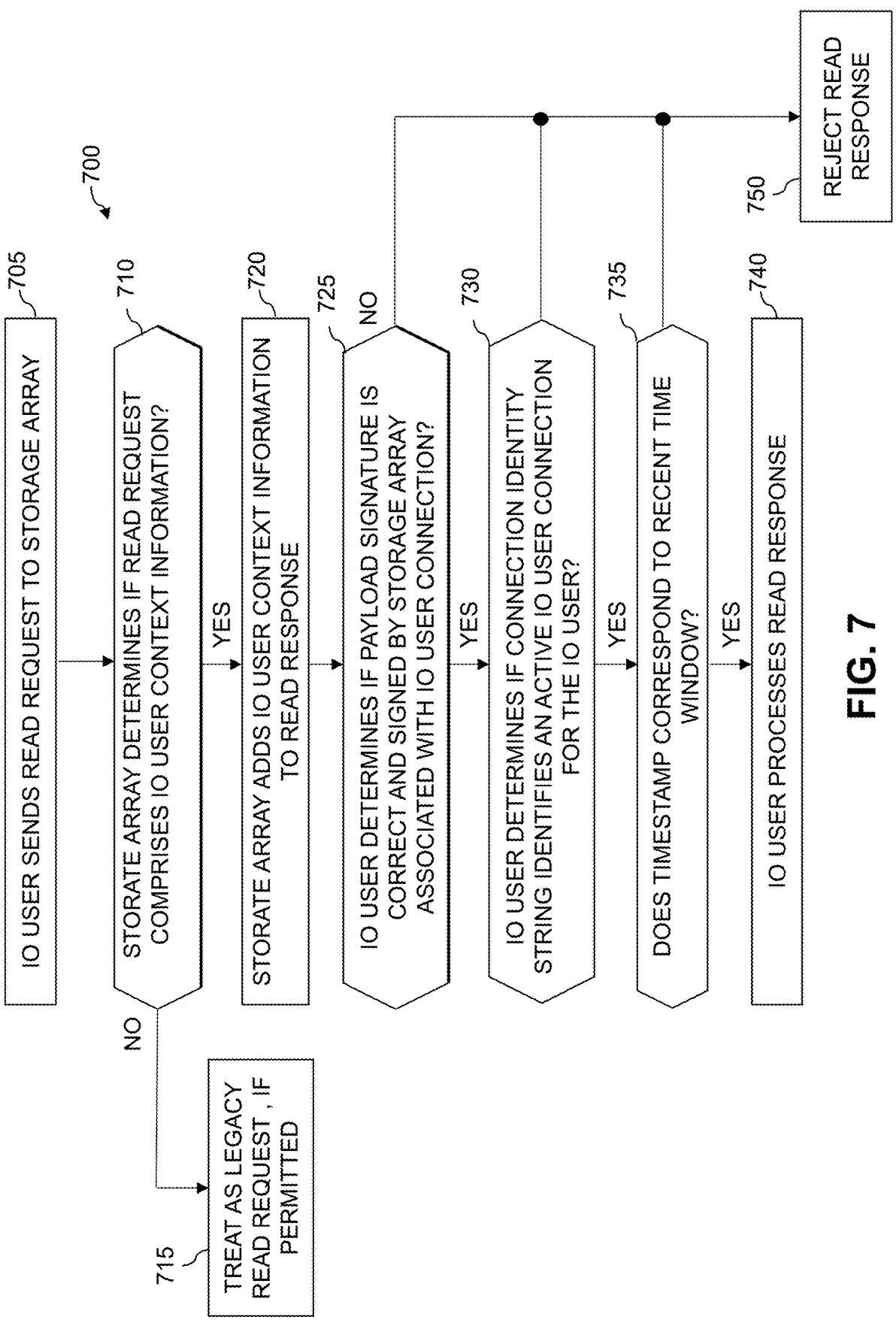
FIG. 7 is a flow diagram illustrating an exemplary implementation of a method for processing read operations over IO user connections, according to one embodiment of the disclosure.

FIG. 7 is a flow diagram illustrating an exemplary implementation of a method 700 for processing read operations over IO user connections, according to one embodiment of the disclosure. In the example of FIG. 7, an IO user sends a read request to a storage array in step 705. A test is performed in step 710 by the storage array to determine if the read request comprises IO user context information. If it is determined in step 710 that the read request does not comprise IO user context information, then the read request is processed as a legacy read request in step 715, if permitted. If, however, it is determined in step 710 that the received read request does comprise IO user context information, then the storage array adds IO user context information to the read response in step 720.

A test is performed in step 725 by the IO user to determine if the payload signature associated with the read response is correct and signed by the storage array associated with the IO user connection on which the read response was received. If it is determined in step 725 that the payload signature associated with the read response is not correct or is not signed by the storage array associated with the IO user connection, then the read response is rejected in step 750. If, however, it is determined in step 725 that the payload signature associated with the read response is correct and is signed by the storage array associated with the IO user connection, then a further test is performed in step 730 to determine if the connection identity string identifies an active IO user connection for the IO user.

If it is determined in step 730 that the connection identity string does not identify an active IO user connection for the storage IO user, then the read response is rejected in step 750. If, however, it is determined in step 730 that the connection identity string does identify an active IO user connection for the IO user, then a further test is performed in step 735 to determine if the timestamp of the read response corresponds to a recent time window (e.g., of a configurable or designated size).

If it is determined in step 735 that the timestamp of the read response does not correspond to a recent time window, then the read response is rejected in step 750. If, however, it is determined in step 735 that the timestamp of the read response does correspond to a recent time window, then the read response is processed by the IO user in step 740.

The addition of IO user context read metadata to each read request by an IO user allows the storage array to enable multiple IO user connections to the same storage volume from the same host device simultaneously. In addition, the read metadata allows the storage array to protect against unauthorized IO user read requests, regardless of the host device. Storage arrays can add IO user context read metadata to read responses.

The sequence of steps 720, 725, 730, 735, 740, 750 (or a subset thereof) is sometimes referred to herein as an IO user context processing routine for read operations. It is noted that the test performed in steps 725, 730 and 735 can be performed in any order.

In many cases it is not desirable to change the software code of existing applications so that they can read and write to IO user-aware storage volumes. In one or more embodiments, IO user-aware storage volume libraries are employed that wrap the standard (e.g., libc) read and write operations and the libraries set up the IO user-aware storage volume connection using, for example, environment variables (e.g., by re-linking the application with the wrapper libc and setting the IO user in the environment variables for the application to start using IO user-aware storage volumes).

Figure 8:
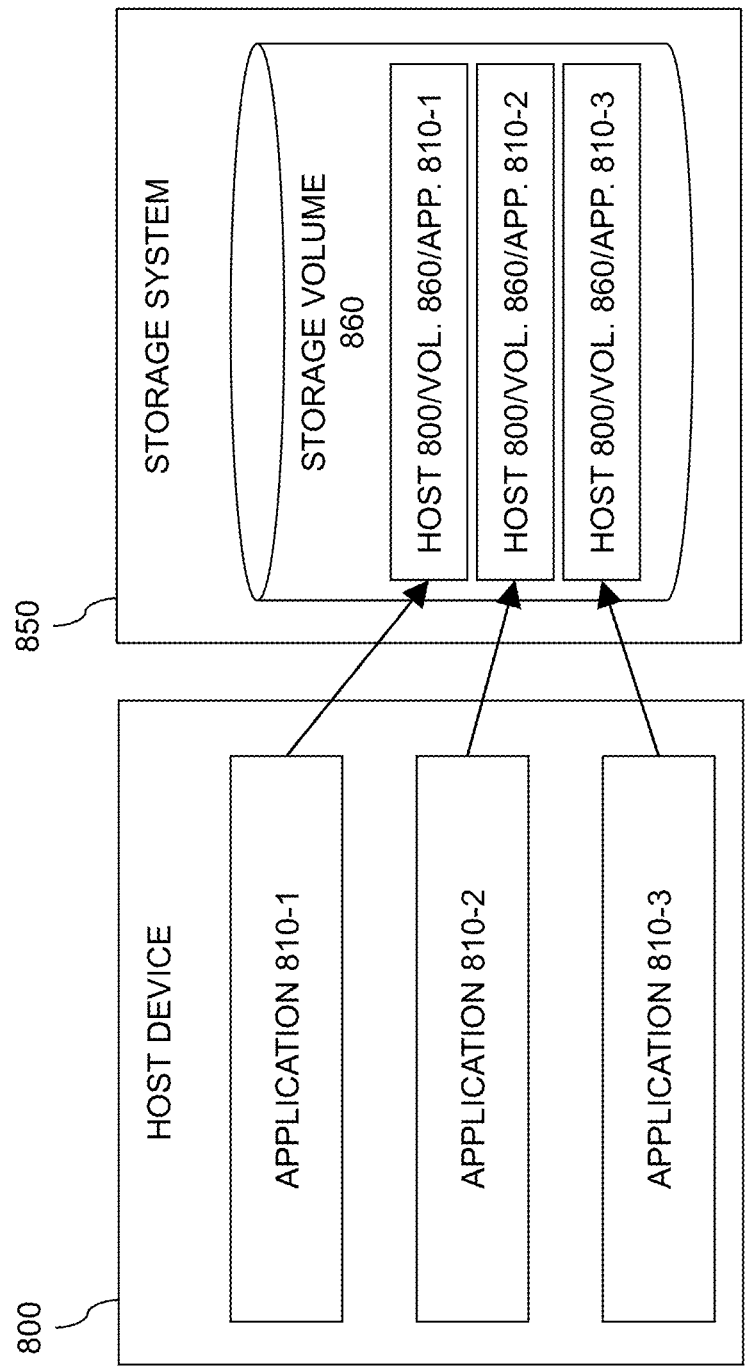
FIG. 8 is a block diagram illustrating a processing of read operations from multiple applications over corresponding IO user connections based at least in part on IO user context information associated with a respective IO user connection, according to one embodiment of the disclosure.

FIG. 8 is a block diagram illustrating a processing of read operations by storage system 850 from multiple applications 810 on a host device 800 over corresponding IO user connections, based at least in part on IO user context information associated with a respective IO user connection, according to one embodiment of the disclosure. In the example of FIG. 8, the IO user context information associated with the IO user connection for application 810-1 allows the application 810-1 to read from a portion of a storage volume 860 identified as "Host 800/Vol. 860/App. 810-1." In addition, the IO user context information associated with the IO user connection for application 810-2 allows the application 810-2 to simultaneously read from a portion of the storage volume 860 identified as "Host 800/Vol. 860/App. 810-2;" and the IO user context information associated with the IO user connection for application 810-3 allows the application 810-3 to simultaneously read from a portion of the storage volume 860 identified as "Host 800/Vol. 860/App. 810-3." In this manner, different portions of one or more storage volumes can be dedicated to particular IO users (such as applications) for simultaneous processing of read operations to the respective storage volume portions.

It is noted that when read operations do not comprise IO user context information (e.g., metadata), then all such read operations will be directed to the same storage volume associated with a default (e.g., legacy) connection.

Figure 9:
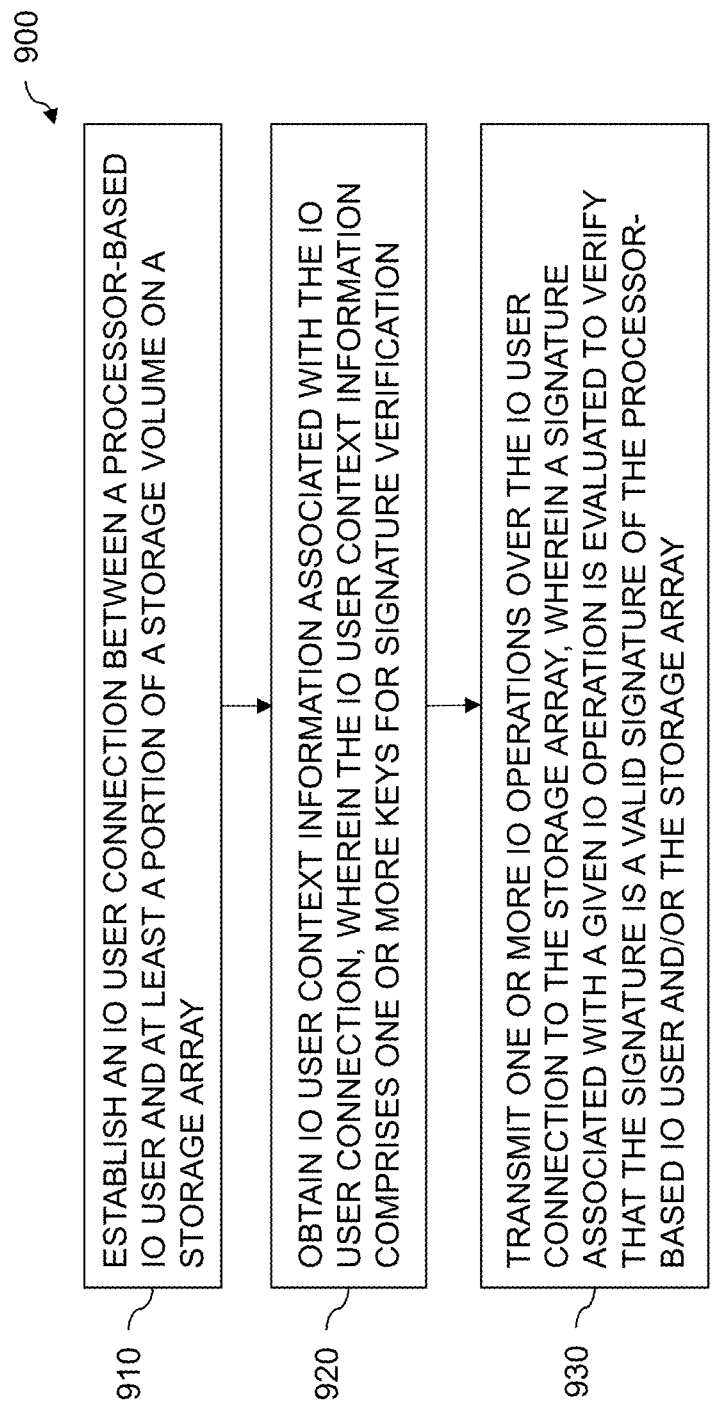
FIG. 9 is a flow diagram illustrating an exemplary implementation of a process for creating secure IO user connections between IO users and storage volumes, according to one exemplary embodiment.

FIG. 9 is a flow diagram illustrating an exemplary implementation of a process 900 for creating secure IO user connections between processor-based IO users and storage volumes, according to one exemplary embodiment. In the example of FIG. 9, the exemplary process 900 initially establishes an IO user connection in step 910 between a processor-based IO user and at least a portion of a storage volume on a storage array. In step 920, IO user context information associated with the IO user connection is obtained, wherein the IO user context information comprises one or more keys for signature verification.

In step 930, the process 900 transmits one or more IO operations over the IO user connection, wherein a signature associated with a given IO operation is evaluated to verify that the signature is a valid signature of one or more of the processor-based IO user and the storage array.

In one or more embodiments, the obtained IO user context information further comprises an identifier of a signature generation function that is used to generate the signature associated with the given IO operation. The signature generation function may comprise a message authentication code generation function and wherein the signature associated with the given IO operation is generated by one or more of the processor-based IO user and the storage array by applying the message authentication code generation function to (i) a payload of the given IO operation and (ii) at least a portion of the IO user context information.

In some embodiments, the obtained IO user context information further comprises a connection identity string identifying the IO user connection and wherein the connection identity string is evaluated to determine whether the connection identity string is associated with an active IO user connection. The connection identity string may be further evaluated to determine whether the corresponding IO user connection is authorized to write to the at least the portion of the storage volume. The connection identity string may be used to identify a given set of attributes of the IO user connection. At least one of the one or more IO operations may be processed using an IO user context processing routine based at least in part on a presence of the connection identity string in the at least one IO operation.

In at least one embodiment, the establishing is performed by the processor-based IO user using a control path to the storage array. The obtained IO user context information may further comprise a timestamp that is evaluated to detect one or more anomalous IO operations. The processor-based IO user may comprise one or more of an application, an application on behalf of another user, an operating system of a host device, at least one processing device and a virtualized computing resource. When the processor-based IO user comprises an application, one or more wrapper libraries for read operations and write operations of the application may be used to process the one or more IO operations over the IO user connection.

The processor-based IO user may establish one or more of: (i) multiple IO user connections between the processor-based IO user and a given storage volume; (ii) multiple IO user connections between the processor-based IO user and respective portions of a given storage volume; and (iii) multiple IO user connections between the processor-based IO user on one or more host devices and the storage array. The one or more IO operations over the IO user connection may comprise one or more fields for connection metadata.

The particular processing operations and other network functionality described in conjunction with the flow diagrams of FIGS. 4, 6, 7 and 9 are presented by way of illustrative example only and should not be construed as limiting the scope of the disclosure in any way. Alternative embodiments can use other types of processing operations to create secure IO user connections between IO users and storage volumes. For example, the ordering of the process steps may be varied in other embodiments, or certain steps may be performed concurrently with one another rather than serially. In one aspect, the process can skip one or more of the actions. In other aspects, one or more of the actions are performed simultaneously. The processing of one or more of the actions can also be distributed between multiple components. In some aspects, additional actions can be performed.

In some embodiments, techniques are provided for creating secure IO user connections between IO users and storage volumes. In one or more embodiments, the disclosed secure IO user connection creation techniques define IO users with a storage array and associate each IO operation (e.g., read/write operations) with a corresponding IO user. The IO operations of a given IO user can be transmitted between the IO user and at least a portion of a given storage volume using an IO user connection established between the given IO user and the at least the portion of the given storage volume. The IO user can represent an application, an application, acting on behalf of another user, an operating system of a host device, at least one processing device and/or a virtualized computing resource (e.g., a container or virtual machine).

The disclosed secure IO user connection creation techniques allow for IO user-level features, as opposed to the host-level features associated with current storage systems. In this manner, IO users can define their own storage properties, regardless of the host device, including IO user-level features such as IO user-level access control, IO user-level inflight data encryption, and advanced per-IO user storage performance analysis and tuning.

One or more embodiments of the disclosure provide improved methods, apparatus and computer program products for creating secure IO user connections between IO users and storage volumes. The foregoing applications and associated embodiments should be considered as illustrative only, and numerous other embodiments can be configured using the techniques disclosed herein, in a wide variety of different applications.

It should also be understood that the disclosed secure IO user connection creation techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for creating secure IO user connections between IO users and storage volumes may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based secure IO user connection creation engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based secure IO user connection creation platform in illustrative embodiments. The cloud-based systems can include block storage such as Amazon EBS (Elastic Block Store), GCP Persistent Disk, and Microsoft Azure Managed Disks.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 10 and 11. These platforms may also be used to implement at least portions of other information processing systems in other embodiments.

Figure 10:
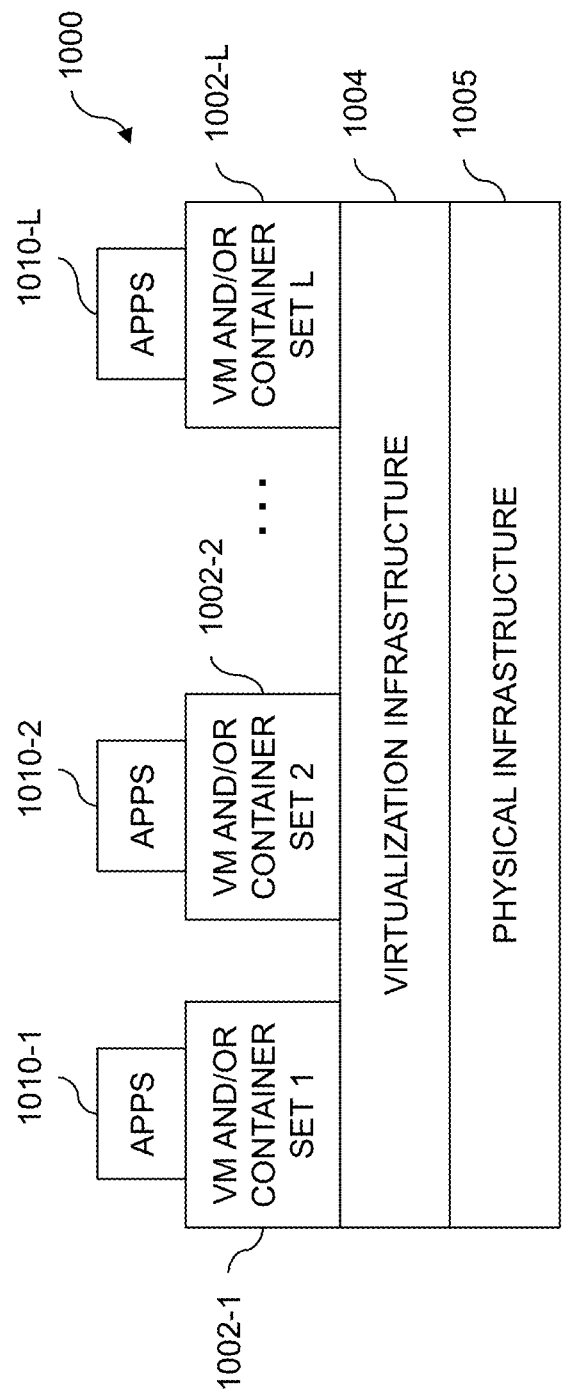
FIG. 10 illustrates an exemplary processing platform that may be used to implement at least a portion of one or more embodiments of the disclosure comprising a cloud infrastructure.

FIG. 10 shows an example processing platform comprising cloud infrastructure 1000. The cloud infrastructure 1000 comprises a combination of physical and virtual processing resources that may be utilized to implement at least a portion of the information processing system 100. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. Such implementations can provide secure IO user connection creation functionality of the type described above for one or more processes running on a given one of the VMs. For example, each of the VMs can implement secure IO user connection creation control logic and associated functionality for management and processing of IOs over such IO user connections for one or more processes running on that particular VM.

An example of a hypervisor platform that may be used to implement a hypervisor within the virtualization infrastructure 1004 is a compute virtualization platform which may have an associated virtual infrastructure management system such as server management software. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system. Such implementations can provide secure IO user connection creation functionality of the type described above for one or more processes running on different ones of the containers. For example, a container host device supporting multiple containers of one or more container sets can implement one or more instances of secure IO user connection creation control logic and associated functionality for management and processing of IOs over such IO user connections.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises at least a portion of the given system and includes a plurality of processing devices, denoted 1102-1, 1102-2, 1102-3, . . . 1102-K, which communicate with one another over a network 1104. The network 1104 may comprise any type of network, such as a WAN, a LAN, a satellite network, a telephone or cable network, a cellular network, a wireless network such as WiFi or WiMAX, or various portions or combinations of these and other types of networks.

The processing device 1102-1 in the processing platform 1100 comprises a processor 1110 coupled to a memory 1112. The processor 1110 may comprise a microprocessor, a microcontroller, an application specific integrated circuit (ASIC), a field programmable gate array (FPGA) or other type of processing circuitry, as well as portions or combinations of such circuitry elements, and the memory 1112, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and the given system may include additional or alternative processing platforms, as well as numerous distinct processing platforms in any combination, with each such platform comprising one or more computers, storage devices or other processing devices.

Figure 11:
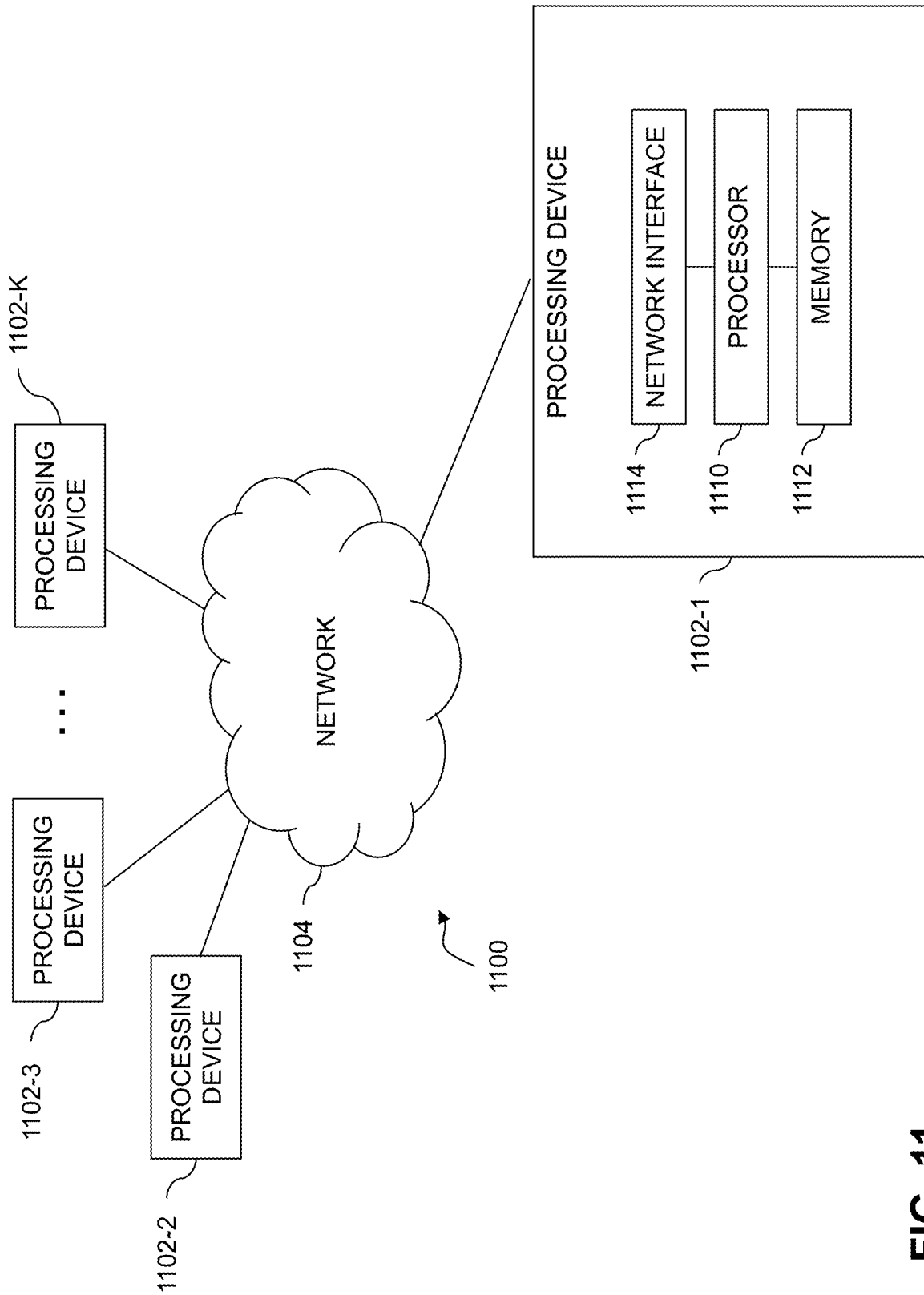
FIG. 11 illustrates another exemplary processing platform that may be used to implement at least a portion of one or more embodiments of the disclosure.

Multiple elements of an information processing system may be collectively implemented on a common processing platform of the type shown in FIG. 10 or 11, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell Technologies.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising: establishing an input/output (IO) user connection between a processor-based IO user and at least a portion of a storage volume on a storage array; obtaining IO user context information associated with the IO user connection, wherein the IO user context information comprises one or more keys for signature verification; and transmitting one or more IO operations from the processor-based IO user, over the IO user connection, to the at least the portion of the storage volume, wherein a given IO operation from the processor-based IO user comprises one or more of a read operation and a write operation, wherein a signature associated with a response to a given read operation is evaluated, by the processor-based IO user, to verify that the signature is a valid signature of one or more of the processor-based IO user and the storage array an wherein a signature associated with a given write operation is evaluated, by the storage array, to verify that the signature is a valid signature of the processor-based IO user; wherein the method is performed by at least one processing device comprising a processor coupled to a memory.

2. The method of claim 1, wherein the obtained IO user context information further comprises an identifier of a signature generation function that is used to generate the signature associated with the given IO operation.

3. The method of claim 2, wherein the signature generation function comprises a message authentication code generation function and wherein the signature associated with the given IO operation is generated by one or more of the processor-based IO user and the storage array by applying the message authentication code generation function to (i) a payload of the given IO operation and (ii) at least a portion of the IO user context information.

4. The method of claim 1, wherein the obtained IO user context information further comprises a connection identity string identifying the IO user connection and wherein the connection identity string is evaluated to determine whether the connection identity string is associated with an active IO user connection.

5. The method of claim 4, wherein the connection identity string is further evaluated to determine whether the corresponding IO user connection is authorized to write to the at least the portion of the storage volume.

6. The method of claim 4, wherein the connection identity string is used to identify a given set of attributes of the IO user connection.

7. The method of claim 4, wherein at least one of the one or more IO operations is processed using an IO user context processing routine based at least in part on a presence of the connection identity string in the at least one IO operation.

8. The method of claim 1, wherein the establishing is performed by the processor-based IO user using a control path to the storage array.

9. The method of claim 1, wherein the processor-based IO user establishes one or more of: (i) multiple IO user connections between the processor-based IO user and a given storage volume; (ii) multiple IO user connections between the processor-based IO user and respective portions of a given storage volume; and (iii) multiple IO user connections between the processor-based IO user on one or more host devices and the storage array.

10. The method of claim 1, wherein the obtained IO user context information further comprises a timestamp that is evaluated to detect one or more anomalous IO operations.

11. The method of claim 1, wherein the processor-based IO user comprises one or more of an application, an application acting on behalf of another user, an operating system of a host device, at least one processing device and a virtualized computing resource.

12. The method of claim 1, wherein the processor-based IO user comprises an application and wherein one or more wrapper libraries for read operations and write operations of the application process the one or more IO operations over the IO user connection.

13. The method of claim 1, wherein the one or more IO operations over the IO user connection comprise one or more fields for connection metadata.

14. An apparatus comprising: at least one processing device comprising a processor coupled to a memory; the at least one processing device being configured to implement the following steps: establishing an input/output (IO) user connection between a processor-based IO user and at least a portion of a storage volume on a storage array; obtaining IO user context information associated with the IO user connection, wherein the IO user context information comprises one or more keys for signature verification; and transmitting one or more IO operations from the processor-based IO user, over the IO user connection, to the at least the portion of the storage volume, wherein a given IO operation from the processor-based IO user comprises one or more of a read operation and a write operation, wherein a signature associated with a response to a given read operation is evaluated, by the processor-based IO user, to verify that the signature is a valid signature of one or more of the processor-based IO user and the storage array, and wherein a signature associated with a given write operation is evaluated, by the storage array, to verify that the signature is a valid signature of the processor-based IO user.

15. The apparatus of claim 14, wherein the obtained IO user context information further comprises an identifier of a signature generation function that is used to generate the signature associated with the given IO operation and wherein the signature generation function comprises a message authentication code generation function and wherein the signature associated with the given IO operation is generated by one or more of the processor-based IO user and the storage array by applying the message authentication code generation function to (i) a payload of the given IO operation and (ii) at least a portion of the IO user context information.

16. The apparatus of claim 14, wherein the obtained IO user context information further comprises a connection identity string identifying the IO user connection, wherein the connection identity string is evaluated to determine whether the connection identity string is associated with an active IO user connection and wherein the connection identity string is further evaluated to determine whether the corresponding IO user connection is authorized to write to the at least the portion of the storage volume.

17. The apparatus of claim 14, wherein the obtained IO user context information further comprises a timestamp that is evaluated to detect one or more anomalous IO operations.

18. A non-transitory processor-readable storage medium having stored therein program code of one or more software programs, wherein the program code when executed by at least one processing device causes the at least one processing device to perform the following steps:
establishing an IO (input/output) user connection between a processor-based IO user and at least a portion of a storage volume on a storage array;
obtaining IO user context information associated with the IO user connection, wherein the IO user context information comprises one or more keys for signature verification; and
transmitting one or more IO operations from the processor-based IO user, over the IO user connection, to the at least the portion of the storage volume, wherein a given IQ operation from the processor-based IO user comprises one or more of a read operation and a write operation, wherein a signature associated with a response to a given read operation is evaluated, by the processor-based IO user, to verify that the signature is a valid signature of the storage array, and wherein a signature associated with a given write operation is evaluated, by the storage array, to verify that the signature is a valid signature of the processor-based IO user.

19. The non-transitory processor-readable storage medium of claim 18, wherein the obtained IO user context information further comprises an identifier of a signature generation function that is used to generate the signature associated with the given IO operation and wherein the signature generation function comprises a message authentication code generation function and wherein the signature associated with the given IO operation is generated by one or more of the processor-based IO user and the storage array by applying the message authentication code generation function to (i) a payload of the given IO operation and (ii) at least a portion of the IO user context information.

20. The non-transitory processor-readable storage medium of claim 18, wherein the obtained IO user context information further comprises a connection identity string identifying the IO user connection, wherein the connection identity string is evaluated to determine whether the connection identity string is associated with an active IO user connection and wherein the connection identity string is further evaluated to determine whether the corresponding IO user connection is authorized to write to the at least the portion of the storage volume.

\* \* \* \* \*

UNITED STATES PATENT AND TRADEMARK OFFICE
CERTIFICATE OF CORRECTION

| | |
|---|---|
| PATENT NO. | : 12,210,745 B2 |
| APPLICATION NO. | : 18/099036 |
| DATED | : January 28, 2025 |
| INVENTOR(S) | : Shoham Levy et al. |

It is certified that error appears in the above-identified patent and that said Letters Patent is hereby corrected as shown below:

In the Claims

Column 18, Lines 53-54, in Claim 1, replace "signature is a valid signature of one or more of the processor-based IO user and the storage array an wherein a signature" with -- signature is a valid signature of the storage array, and wherein a signature --

Column 19, Lines 66-67, in Claim 14, replace "is a valid signature of one or more of the processor-based IO user and the storage array, and wherein a signature associ-" with -- is a valid signature of the storage array, and wherein a signature associ- --

Signed and Sealed this
Twenty-fifth Day of March, 2025

Coke Morgan Stewart
*Acting Director of the United States Patent and Trademark Office*